(12) United States Patent
Yamaguchi

(10) Patent No.: US 7,701,167 B2
(45) Date of Patent: Apr. 20, 2010

(54) SYSTEM AND METHOD FOR SUPERVISING BATTERY FOR VEHICLE

(75) Inventor: Kazuhi Yamaguchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 483 days.

(21) Appl. No.: 11/707,155

(22) Filed: Feb. 16, 2007

(65) Prior Publication Data
US 2007/0194748 A1 Aug. 23, 2007

(30) Foreign Application Priority Data
Feb. 21, 2006 (JP) ............... 2006-044582

(51) Int. Cl.
*H02J 7/14* (2006.01)
(52) U.S. Cl. ............... 320/104; 307/10.1; 713/320
(58) Field of Classification Search ........... 320/104; 713/320, 300, 310; 307/9.1, 10.1–3, 10.7
See application file for complete search history.

(56) References Cited

U.S. PATENT DOCUMENTS

| | | | | |
|---|---|---|---|---|
| 5,690,186 | A * | 11/1997 | Sugioka et al. | 180/273 |
| 6,194,997 | B1 * | 2/2001 | Buchner et al. | 340/426.26 |
| 6,255,939 | B1 * | 7/2001 | Roth et al. | 340/425.5 |
| 6,925,369 | B2 * | 8/2005 | Obayashi et al. | 701/36 |
| 2002/0153995 | A1 * | 10/2002 | Kumano | 340/5.62 |
| 2004/0212517 | A1 * | 10/2004 | Inoue | 340/905 |
| 2005/0233866 | A1 * | 10/2005 | Miyamaru et al. | 482/57 |
| 2006/0170536 | A1 * | 8/2006 | Yu et al. | 340/426.1 |
| 2007/0007916 | A1 * | 1/2007 | Wu | 318/66 |

FOREIGN PATENT DOCUMENTS

| | | |
|---|---|---|
| JP | A 09-083278 | 3/1997 |
| JP | A 10-271698 | 10/1998 |
| JP | A 10-288811 | 10/1998 |
| JP | B2 3212535 | 7/2001 |
| JP | A-2002-087799 | 3/2002 |
| JP | A-2003-072352 | 3/2003 |
| JP | A 2004-106621 | 4/2004 |
| JP | A 2004-229479 | 8/2004 |
| JP | A-2004-255977 | 9/2004 |
| JP | A-2004-276798 | 10/2004 |
| JP | A-2004-352249 | 12/2004 |
| JP | A-2005-164604 | 6/2005 |
| JP | A 2005-297816 | 10/2005 |

OTHER PUBLICATIONS

Japanese Office Action, issued Aug. 11, 2009.

* cited by examiner

*Primary Examiner*—Edward Tso
*Assistant Examiner*—Arun Williams
(74) *Attorney, Agent, or Firm*—Oliff & Berridge, ePLC

(57) ABSTRACT

A system for supervising a battery mounted on a vehicle, the system includes a first part that detects a person in a vehicle in a stopped state, and a second part that executes a power saving control for reducing power of a battery on the vehicle consumed in electrical units mounted on the vehicle when the first part detects no person in the vehicle.

7 Claims, 5 Drawing Sheets

FIG. 4

| UNIT | POWER SUPPLY SHOULD BE STOPPED |
|---|---|
| AIR CONDITIONER | YES |
| AUDIO/NAVIGATION | YES |
| SMALL LAMPS | YES |
| HEAD LAMPS | YES |
| STOP LAMP | YES |
| INDICATOR | YES |
| DC/DC CONVERTER | NO |
| OIL PUMP | NO |

SYSTEM AND METHOD FOR SUPERVISING BATTERY FOR VEHICLE

BACKGROUND OF THE INVENTION

1. Field of the Invention

This invention generally relates to a system and a method for supervising a vehicle-use battery.

2. Description of the Related Art

A vehicle equipped with an idle stop function is known. The idle stop function is aimed at improving fuel economy and reducing the amount of exhaust gas for internal combustion engines on vehicles. When a predetermined condition is met, the engine is stopped. When a predetermined starting condition is met, the engine is automatically restarted. An example of the idle stop function is described in Japanese Patent Application Publication No. 2004-229479.

The following situation may happen to the vehicle equipped with the idle stop function. A user temporarily stops the vehicle in the idle stop state and goes out of the vehicle, so that no person rides on the vehicle. In this case, if the user goes out of the vehicle while an electrical unit such as an air conditioner, a navigation system or an audio system is operating, the operating electrical unit consumes a battery on the vehicle, and the battery may finally run out. On the other hand, the user may feel uncomfortable if all electrical units are OFF when the user returns to the vehicle or the user is needed to operate the ignition key to restart the engine.

SUMMARY OF THE INVENTION

The present invention has been made in view of the above circumstances, and provides a system and a method for supervising a battery for a vehicle in which electrical unit on the vehicle consumes a reduced amount of battery power while conformability of users is improved.

According to an aspect of the present invention, there is provided a system for supervising a battery mounted on a vehicle, the system including: a first part that detects a person in a vehicle in a stopped state; and a second part that executes a power saving control for reducing power of a battery on the vehicle consumed in electrical units mounted on the vehicle when the first part detects no person in the vehicle. It is thus possible to prevent battery power from being wastefully consumed when no person is in the vehicle.

The system may be configured so that the second part determines to which electrical units the power saving control should be executed on the basis of at least one of states of the electrical units, environment about the vehicle, and a vehicle condition. It is thus possible to reduce battery power consumption while preventing a specific electrical unit important to the driver or passenger in the stopped state from being stopped. It is also possible to appropriately select electrical units to which the power saving control should be carried out because at least one of the states of the electrical units, the environment about the vehicle, and the vehicle condition is taken into consideration.

The system may be configured so as to further include a third part that sets the vehicle in an antitheft state when the first part detects no person. It is thus possible to prevent the vehicle from being stolen during the power saving control.

The system may be configured so as to further include a fourth part that determines, during execution of the power saving control, whether an abnormality that prevents execution of the power saving control occurs, and executes one of first and second controls when an abnormality is detected, the first control including starting an engine of the vehicle, and the second control including stopping supplying power from the battery to the electrical units. It is thus possible to protect the battery from the abnormality.

The system may be configured so as to further include a fifth part that determines whether the battery has a reduced capacity during execution of the power saving control, and executes one of first and second controls when the battery has the reduced capacity, the first control including starting an engine of the vehicle, and the second control including stopping supplying power from the battery to the electrical units. It is thus possible to protect the battery from the abnormality.

The system may be configured so that the stopped state includes an idle stop state in which an engine of the vehicle is stopped. The system may be configured so that the second part has a table that defines electrical units to which power supply should be stopped in the stopped mode. The system may be configured so that the second part stops supplying power to a specific electrical unit taking environment of the vehicle into account even when the specific electrical unit is one of the electrical units defined in the table. The system may be configured so that the second part stops supplying power to a specific electrical unit taking a vehicle condition into account even when the specific electrical unit is one of the electrical units defined in the table. The system may be configured so that the vehicle condition includes a remaining capacity of the batter. The system as claimed in claim 1, wherein the second part shuts off power supply to the electrical units in the power saving control. The system as claimed in claim 1, wherein the second part reduces power supplied to the electrical units from the battery in the power saving control.

According to another aspect of the present invention, there is provided a method supervising a battery mounted on a vehicle, the method comprising the steps of: detecting a person in a vehicle in a stopped state; and executing a power saving control for reducing power of a battery on the vehicle consumed in electrical units mounted on the vehicle when no person in the vehicle is detected.

BRIEF DESCRIPTION OF THE DRAWINGS

Other objects, features and advantages of the present invention will become more apparent from the following detailed description when read in conjunction with the accompanying drawings, in which:

FIG. 4 shows exemplary data used in the power saving control; and

DESCRIPTION OF THE PREFERRED EMBODIMENTS

A description will now be given, with reference to the accompanying drawings, of embodiments of the present invention.

Figure 1:
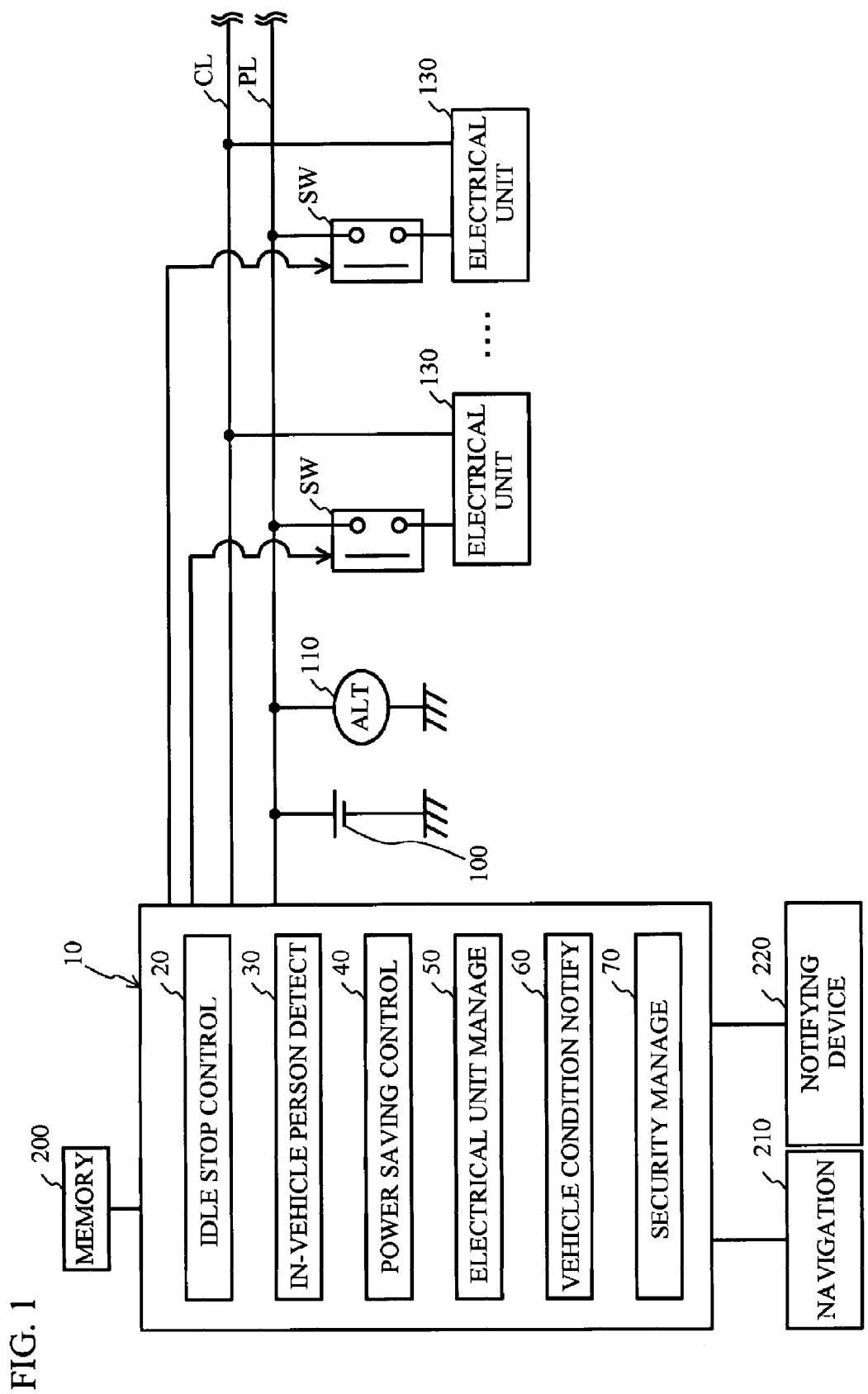
FIG. 1 is a block diagram of an electrical system of a vehicle to which a system for supervising a vehicle-use battery is applied in accordance with an embodiment of the present invention.

FIG. 1 is a block diagram of an electrical system of a vehicle to which a system for supervising a vehicle-use battery is applied in accordance with an embodiment of the present invention. Referring to FIG. 1, the electrical system of the vehicle includes an idle stop ECU (Electronic Control Unit) 10 functioning as the vehicle-use battery supervising system, a battery 100, an alternator (ALT) 110 and multiple electrical units 130. Hereinafter, the idle stop ECU 10 is referred to as IS-ECU 10.

The battery 100 may, for example, be a lead-acid battery and supplies electrical power stored therein to the on-vehicle electrical units. The alternator 110 is driven by an engine on the vehicle through a belt (not shown), and generates an alternating output, which is then rectified by a built-in diode. The resultant DC output is supplied to the electrical units 130 and is also used to charge the battery 100.

The multiple electrical units 130 may be a starter, a winker, a headlight, or a switch, and may be a control system such as a fuel injection system or an antilock brake system. The multiple electrical units 130 are supplied with electrical power via the power supply line PL. The security unit 120 and the multiple electrical units 130 may be equipped with respective controllers (ECU), each of which may include a hardware structure having a processor, a memory and so on and related software. The controllers, or the on-unit ECUs are supplied with electrical power via the power supply line PL and are capable of communicating with the IS-ECU 10 via a communication line CL. Switches SW connect and disconnect the electrical units 130 to and from the power supply line PL in response to control signals from the IS-ECU 10.

The IS-ECU 10 is composed of a hardware structure having a processor, a memory and so on and related software. As shown in FIG. 1, the IS-ECU 10 functionally has an idle stop control part 20, an in-vehicle person detecting part 30, a power saving control part 40, an electrical unit management part 50, a vehicle condition notifying part 60 and a security management part 70. The IS-ECU 10 is supplied with power via the power supply line PL from the battery 100, and is capable of sending and receiving data to and from the electrical units 130 via the communication line CL. The IS-ECU 10 is connected to an external memory 200, which may be a non-volatile semiconductor memory, a navigation system 210, and a notifying device 220, which may be a display or speaker and visually or acoustically notifies the user of necessary information.

The idle stop control part 20 automatically stops the engine when an automatic stop condition stands in the engine working state, and automatically restarts the engine when an automatic start condition stands in the engine stopping state. The idle stop control technique is known and a further description thereof is omitted here.

The in-vehicle person detecting part 30 determines whether a person is in the vehicle. This determination may be done by referring to information, which may, for example, be an output signal of sensors on sheets, image data of a camera provided in the vehicle, part record information about opening and closing doors, or information from a smart entry system.

The power saving control part 40 executes a control for saving power of the battery 100 consumed in the electrical units 130 when the in-vehicle person detecting part 30 detects the absence of person. The power saving control will be described in detail later.

The electrical unit management part 50 manages the electrical units 130 during the time when the power saving control part 40 executes the power saving control.

The vehicle condition notifying part 60 notifies the power saving control part 40 of various vehicle conditions including the condition of the battery 100.

The security management part 70 manages information about the vehicle security and executes a security process such as door locking.

Figure 2:
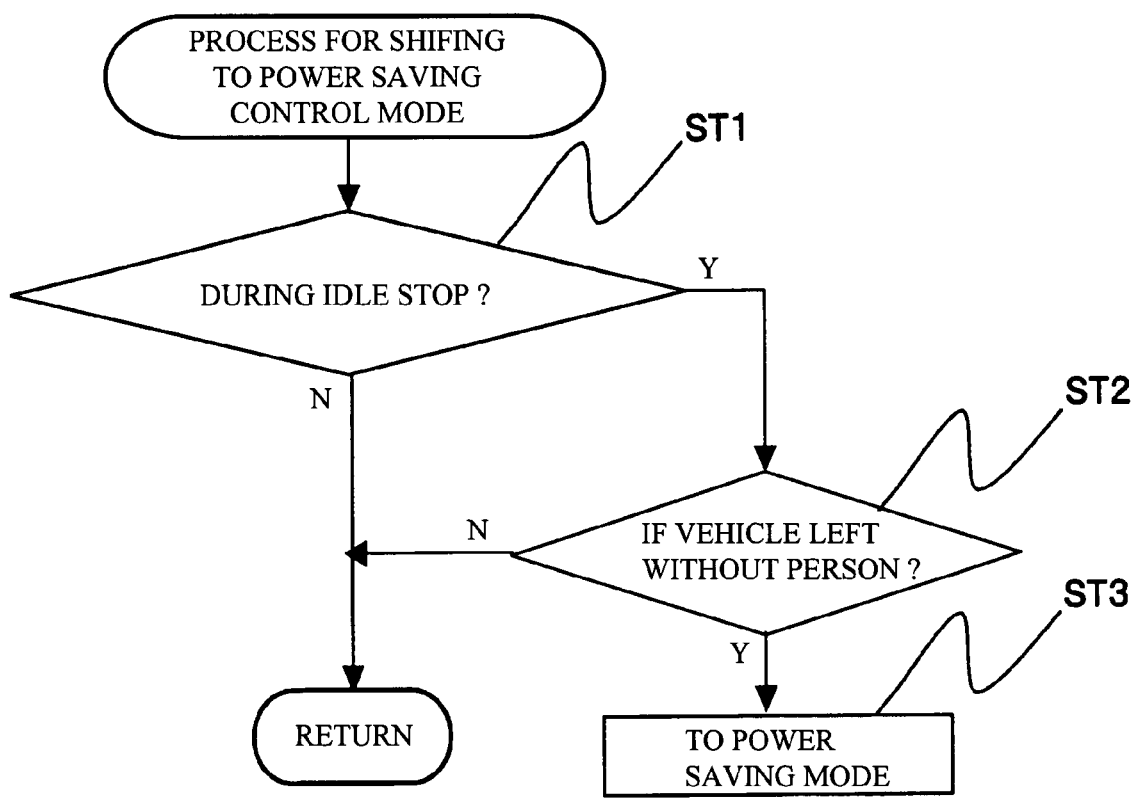
FIG. 2 is a flowchart of a process for making a decision as to whether an IS-ECU shown in FIG. 1 should shift to a power saving control.
Figure 3:
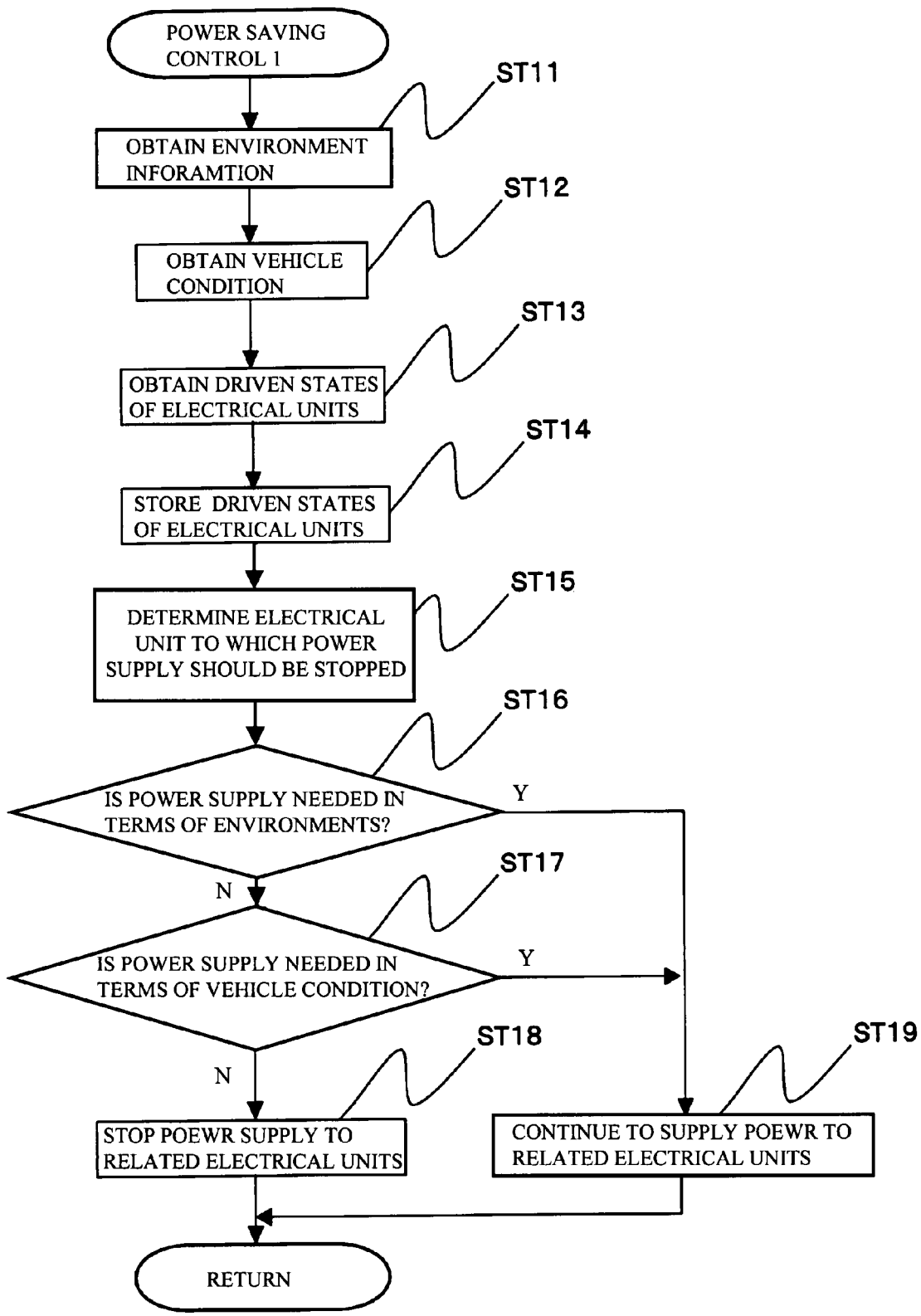
FIG. 3 is a flowchart of an example of the power saving control.
Figure 5:
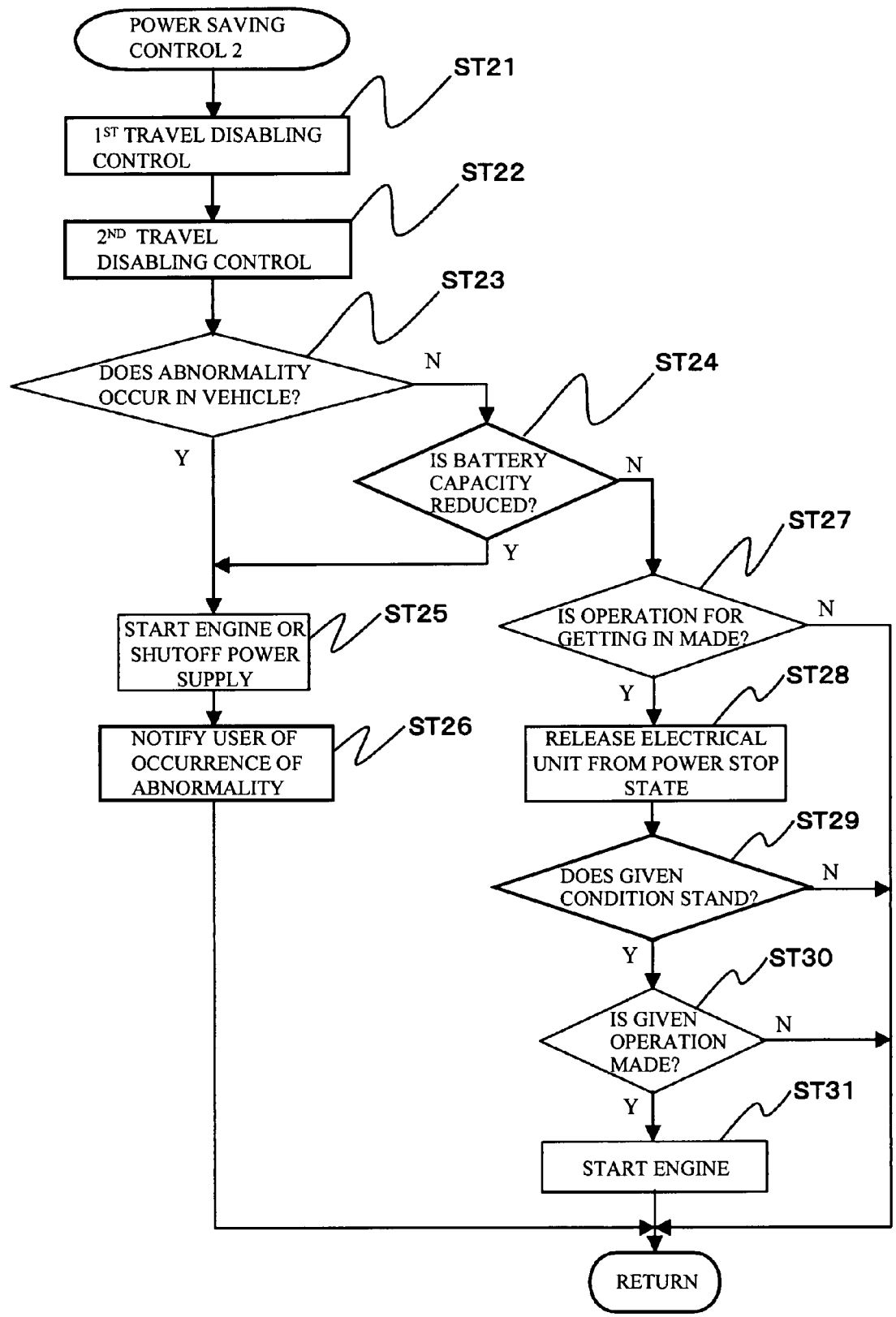
FIG. 5 is a flowchart of another example of the power saving control.

The power saving process executed by the IS-ECU 10 will now be described with reference to FIGS. 2 through 5. FIG. 2 is a flowchart of a process for making a decision as to whether the IS-ECU 10 should shift to the power saving control. FIG. 3 is a flowchart of an example of the power saving control. FIG. 4 shows exemplary data used in the power saving control. FIG. 5 is a flowchart of another example of the power saving control.

Referring to FIG. 2, the IS-ECU 10 determines whether the vehicle is in the idle stop state in which the engine is automatically stopped (step ST1). The sequence of FIG. 2 is repeatedly carried out as long as the engine is driven. When the answer of step ST1 is YES, the IS-ECU 10 determines whether there is no person in the vehicle in which (step ST2). When it is determined that a person is in the vehicle, the IS-ECU 10 ends the process. In contrast, when the determination result of step ST2 shows that no person is in the vehicle, which is thus left, the IS-ECU 10 executes the power saving control process as will be described in detail later (step ST3).

Referring to FIG. 3, the IS-ECU 10 executes the power saving control process. The IS-ECU 10 commences to obtain environment information, which may be information about the inside and outside temperatures, weather, and outside brightness with regard to the vehicle. The information may be obtained from a temperature sensor attached to the vehicle and the communication function of the navigation system 210. Next, the IS-ECU 10 obtain the vehicle condition, which may include the condition of the battery 100 (step ST12). Then, the IS-ECU 10 obtains the driven states of the electrical units 130 (step ST13). The driven states of the electrical units 130 may indicate whether the electrical units 130 are operating and operating states of the electrical units 130. For example, the IS-ECU 10 obtains information about the outputting states of the air conditioner and the audio system. The IS-ECU 10 stores the information about the driven states of the electrical units 130 in a built-in memory or the memory 200 (step ST14). Then, the IS-ECU 10 refers to the environment information, the vehicle condition and the driven states of the electrical units 130, and selects one or more electrical units 130 to which power supply from the battery 100 should be stopped (step ST15).

This selection may be performed as follows. Referring to FIG. 4, electrical units 130 to which power supply should be stopped in the power saving mode (target units) are predetermined. The power supply to the electrical units 130 that are defined as those to which power supply should be stopped and are now operating, the associated switches SW are opened. In FIG. 4, symbol "YES" means that power supply to the target unit should be stopped during the idle stop, and symbol "NO" means that power supply to the target unit should not be stopped during the idle stop but the target unit should be supplied with power. In accordance with FIG. 4, power supply is stopped to the electrical units from which no problems arise in the state in which the vehicle is left without any person therein. Examples of those electrical units are the air conditioner, headlamps, turning signals. In contrast, power supply is not stopped to the electrical units that need battery power when the vehicle is restarted. Examples of those electrical units are a DC/DC converter and an oil pump.

Turning to FIG. 3 again, the IS-ECU 10 refers to the aforementioned environment information and determines whether there is one or more electrical units 130 that need power supply (step ST16). When the answer of step ST17 is YES, the IS-ECU 10 continues to supply each electrical unit 130 with power in contrary to the table of FIG. 4.

For example, usually, no problem would arise from the situation in which the power supply to the air conditioner is stopped during the idle stop state. However, when the temperature inside or outside the vehicle is very high or low, it may be preferable to temporarily or constantly operate the air conditioner during the idle stop in order to keep the vehicle inside temperature within a given temperature range. In such as case, the IS-ECU 10 does not stop supplying battery power to the air conditioner but causes the air conditioner to work. When the temperature inside the vehicle falls within the given temperature range, the IS-ECU 10 stops the power supply to the air conditioner. If the temperature inside the vehicle goes out of the given temperature range, the IS-ECU 10 starts the power supply again to cause the air conditioner to return to the given temperature range. The above control sequence may be varied so that the amount of power to be supplied to the electrical unit or units 130 is adjusted rather than the ON/OFF control by the switches SW. The output of the air conditioner may be controlled on the basis of the power applied thereto. By way of another example, the hazard lamps may be controlled on the basis of the environment information. More specifically, the IS-ECU 10 turns ON the hazard lamps in the idle stop state when it is light outside, and allow them to be supplied with power when it is dark outside.

When the answer of step ST16 is NO, the IS-ECU 10 determines, on the basis of the vehicle condition, whether there is any electrical unit or units 130 that need power supply (step ST17). When the answer of step ST17 is YES, the IS-ECU 10 performs step ST19 at which power supply is continuously carried out even to the electrical unit or units 130 that are determined to be supplied with no power at step ST15. In contrast, when it is determined at step ST17 that there is no need to supply the electrical unit or units 130 with power, the IS-ECU 10 stops supplying power to the unit or units 130 (step ST18). For example, if only a small remaining battery capacity is available, power supply to the air conditioner is stopped, even when the air conditioner should be controlled to continuously work because of a very high or low temperature inside or outside the vehicle.

The IS-ECU 10 may perform the power saving control shown in FIG. 5 after the power saving control shown in FIG. 3. The IS-ECU 10 performs a first travel disabling control (step ST21). In the first travel disabling control, the IS-ECU 10 causes a shift lever of the transmission device of the vehicle to be mechanically locked so that the vehicle can be shifted to the travel disabling state. This state may act as an antitheft state in which the vehicle in the absence of any person can be prevented from being stolen.

Subsequently, the IS-ECU 10 performs a second travel disabling control (step ST22). The second travel disabling control prevents the vehicle from traveling by a software control. For example, the IS-ECU 10 prevents an electronic throttle of the engine from opening by the software control. The first and second travel disabling controls implement hard and software antitheft mechanisms.

Then, the IS-ECU 10 determines whether an abnormality that prevents execution of the power saving control happens in the vehicle (step ST23). Such an abnormality may, for example, be a trouble such that communications via the communication line CL are unavailable, or a fault of an electrical oil pump on the vehicle. When an abnormality that prevents execution of the power saving control occurs, the IS-ECU 10 starts the engine, or stops supplying power to the electrical unit or units 130 (power shutoff) (step ST25). The control process executed by the IS-ECU 10 at step ST25 may be selected on the basis of, for example, the type of the vehicle and various conditions defined beforehand. For example, the engine is started and, so that the battery 100 can be charged by the alternator 110 and prevented from running out. Alternatively, when the power supply to the electrical unit or units 130 is selected, the battery 100 is prevented from being consumed and running out. Thereafter, the IS-ECU 10 notifies the user of the occurrence of an abnormality and the contents thereof via the notifying device 220 (step ST26).

When it is determined at step ST23 that no abnormality occurs, the IS-ECU 10 determines whether the battery 100 has a reduced capacity (step ST24). When it is determined that the battery 100 has a reduced capacity, the IS-ECU 10 executes the aforementioned process of steps ST25 and ST26. When the determination result of step ST24 shows that the battery 100 does not have a reduced capacity, the IS-ECU 10 determines whether the user, who may, for example, be an owner of the vehicle, gets in (step ST27). This determination may be done by whether the user has a related smart key (portable equipment) of the smart entry system. When the user has the related smart key, the IS-ECU 10 proceeds to step ST28. When the user gets in the vehicle again, the IS-ECU 10 releases the corresponding electrical unit or units 130 from the state in which the power supply thereto is stopped (step ST28). In addition, the IS-ECU 10 returns the corresponding electrical unit or units 130 to the previous states before the power supply is stopped on the basis of the driven states of the electrical units 130 stored at step ST14 shown in FIG. 3.

Then, the IS-ECU 10 determines whether the given condition for restarting the engine stands (step ST29). For example, the IS-ECU 10 concludes that the given condition for restarting the engine stands when the shift lever of the transmission device is in the P (parking) position or N (neutral) position. When the answer of step ST29 is YES, the IS-ECU 10 determines whether a given operation for starting the engine is carried out (step ST30). For example, the answer of step ST30 is YES when the brake pedal is stepped on. Then, the IS-ECU 10 starts the engine (step ST31).

The present invention is not limited to the specifically described embodiment in which the power supply to the electrical units 130 is stopped but may include a variation in which the amount of power supplied to the electrical units 130 is restrained or adjusted. In this variation, the outputs of the air conditioner and the lamps are reduced to save the battery 100.

The present invention is not limited to the specifically described embodiment in which the power saving control is performed in the idle stop state, but may be applied to a vehicle that is not equipped with the idle stop function, an electric vehicle or a hybrid vehicle.

The present invention is not limited to the specifically described embodiment in which the IS-ECU 10 has the power saving control function (battery supervising function) but may have a variation in which an ECU exclusively provided for the power saving control is mounted on the vehicle along with other ECUs. Another ECU other than the IS-ECU, such as an engine ECU, may have the power saving control function (battery supervising function).

Finally, the present invention is based on Japanese Patent Application No. 2006-044582 filed Feb. 21, 2006, the entire disclosure of which is herein incorporated by reference.

What is claimed is:

1. A system for supervising a battery mounted on a vehicle, the system comprising:
   a first part that detects a person in a vehicle in a stopped state; and
   a second part that has a table that defines electrical units to which power supply from the battery should be stopped and executes a power saving control for reducing power of the battery on the vehicle consumed in the electrical units defined by the table mounted on the vehicle when the first part detects no person in the vehicle.

2. The system as claimed in claim 1, further comprising a fourth part that determines, during execution of the power saving control, whether an abnormality that prevents execution of the power saving control occurs, and executes one of first and second controls when an abnormality is detected,
   the first control including starting an engine of the vehicle, and the second control including stopping supplying power from the battery to the electrical units.

3. The system as claimed in claim 1, further comprising a fifth part that determines whether the battery has a reduced capacity during execution of the power saving control, and executes one of first and second controls when the battery has the reduced capacity,
   the first control including starting an engine of the vehicle, and the second control including stopping supplying power from the battery to the electrical units.

4. The system as claimed in claim 1, wherein the second part stops supplying power to a specific electrical unit taking environment of the vehicle into account even when the specific electrical unit is one of the electrical units defined in the table.

5. The system as claimed in claim 1, wherein the second part stops supplying power to a specific electrical unit taking a vehicle condition into account even when the specific electrical unit is one of the electrical units defined in the table.

6. The system as claimed in claim 5, wherein the vehicle condition includes a remaining capacity of the battery.

7. A method for supervising a battery mounted on a vehicle, the method comprising the steps of:
   detecting a person in a vehicle in a stopped state;
   searching electrical units mounted on the vehicle from a table that defines the electrical units to which a power supply from the battery should be stopped; and
   executing a power saving control for reducing power of the battery on the vehicle consumed in the searched electrical units mounted on the vehicle when no person in the vehicle is detected.

* * * * *